US009428136B2

(12) United States Patent
Ishida et al.

(10) Patent No.: US 9,428,136 B2
(45) Date of Patent: Aug. 30, 2016

(54) AIRBAG DEVICE

(71) Applicant: Fuji Jukogyo Kabushiki Kaisha, Tokyo (JP)

(72) Inventors: Takeshi Ishida, Tokyo (JP); Tooru Yamashita, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/660,770

(22) Filed: Mar. 17, 2015

(65) Prior Publication Data

US 2015/0274111 A1    Oct. 1, 2015

(30) Foreign Application Priority Data

Mar. 28, 2014  (JP) ................ 2014-069667

(51) Int. Cl.
*B60R 21/207* (2006.01)
*B60R 21/231* (2011.01)

(52) U.S. Cl.
CPC ....... *B60R 21/207* (2013.01); *B60R 21/23138* (2013.01); *B60R 2021/2074* (2013.01); *B60R 2021/23107* (2013.01); *B60R 2021/23146* (2013.01); *B60R 2021/23161* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,556,128 A * | 9/1996 | Sinnhuber | ......... | B60R 21/23138 280/730.2 |
| 7,594,675 B2 * | 9/2009 | Bostrom | ............... | B60R 21/207 280/728.2 |
| 7,717,459 B2 * | 5/2010 | Bostrom | ............ | B60R 21/23138 280/730.1 |
| 8,047,564 B2 * | 11/2011 | Kibat | ................ | B60R 21/23138 280/730.2 |
| 8,210,566 B2 * | 7/2012 | Fukawatase | .......... | B60R 21/231 280/728.3 |
| 8,485,551 B2 * | 7/2013 | Dainese | ................ | B60R 21/207 280/730.1 |
| 8,702,123 B2 * | 4/2014 | Mazanek | .............. | B60R 21/207 280/729 |
| 8,899,619 B2 * | 12/2014 | Fukawatase | .......... | B60R 21/207 280/730.2 |
| 2008/0129024 A1 * | 6/2008 | Suzuki | .............. | B60R 21/23138 280/734 |
| 2009/0200775 A1 * | 8/2009 | Sugimoto | ............. | B60R 21/207 280/730.2 |
| 2009/0302584 A1 * | 12/2009 | Sugimoto | ............. | B60R 21/207 280/730.1 |
| 2014/0042733 A1 * | 2/2014 | Fukawatase | ...... | B60R 21/23138 280/730.2 |
| 2014/0375033 A1 * | 12/2014 | Fukawatase | .......... | B60R 21/214 280/729 |
| 2015/0158453 A1 * | 6/2015 | Fujiwara | ............... | B60R 21/207 280/730.2 |
| 2015/0203065 A1 * | 7/2015 | Egusa | ....................... | B60R 7/04 280/730.2 |

FOREIGN PATENT DOCUMENTS

JP    2010-076642 A    4/2010
JP    2010-115947 A    5/2010

OTHER PUBLICATIONS

Chinese Office Action dated Jun. 1, 2016.

* cited by examiner

*Primary Examiner* — Nicole Verley
(74) *Attorney, Agent, or Firm* — McGinn IP Law Group PLLC (57) ABSTRACT

Airbag housings that each house an airbag are respectively provided beneath the lateral face of the driver's seat backrest and the lateral face of a front passenger seat backrest inward in a vehicle width direction. The airbags are inflatable and deployable inwardly in the vehicle width direction as well as in a fore-and-aft direction and a vertical direction of the vehicle.

12 Claims, 6 Drawing Sheets

AIRBAG DEVICE

CROSS-REFERENCE TO RELATED APPLICATIONS

The present application claims priority from Japanese Patent Application No. 2014-069667 filed on Mar. 28, 2014, the entire contents of which are hereby incorporated by reference.

BACKGROUND

1. Technical Field

The present disclosure relates to an airbag device for protecting an occupant such as a driver and a passenger in a vehicle against an impact due to a side collision, the vehicle having seats disposed apart in a vehicle width direction.

2. Related Art

A method has been widely used in which an airbag device provided in a vehicle is activated to reduce an impact to an occupant when a collision of the vehicle occurs. A conventional airbag device is disposed in a steering wheel provided forward of the driver's seat or in an instrument panel provided forward of a front passenger seat so that forward movement of an occupant facing the airbag device is restrained. Thus, an impact to an occupant at the time of a head-on collision of a vehicle is reduced and the occupant may be protected from the head-on collision.

In recent years, a device has been developed that protects an occupant using an airbag device even at the time of a side collision of a vehicle. For example, what is called a side airbag device inflates between the side (door) of a vehicle body and an occupant to protect the occupant. Thus, the occupant is protected against a direct impact in a side collision of a vehicle as well as prevented from colliding with the inner side of the vehicle.

Such a conventional side airbag device is unable to restrain inward movement of the occupant in a vehicle width direction. For this reason, when a side collision of a vehicle occurs, the occupants on the driver's seat and the adjacent front passenger seat may collide with each other, or an occupant may collide with the backrest of the adjacent seat. In order to address such problems, an airbag device described in Japanese Unexamined Patent Application Publication (JP-A) No. 2010-115947 allows an airbag to inflate upward, the airbag being housed in a center console provided between the driver's seat and the adjacent front passenger seat. Thus, the airbag deploys between the driver's seat and the front passenger seat, thereby making it possible to prevent collision between a driver on the driver's seat and a passenger on the front passenger seat. When a passenger is on the front passenger seat, the airbag is supported by the passenger in the vehicle width direction. On the other hand, when a passenger is not on the front passenger seat, the airbag fills a space over the front passenger seat, the space facing the driver on the driver's seat, and the airbag is supported by the door near the front passenger seat. Thus, the inflated airbag is able to provide a reaction force for receiving an impact force in the vehicle width direction, and movement of the driver on the driver's seat toward the front passenger seat may be efficiently restrained.

In the case where the driver's seat and the front passenger seat are disposed apart from each other, the positions of both seats are independently adjustable in a fore-and-aft direction of the vehicle and the angle of a backrest of each seat is also independently adjustable. For this reason, with the airbag device described in JP-A No. 2010-115947, even when a passenger is on the front passenger seat, the inflated airbag may not come into contact with the passenger on the front passenger seat r and may not be supported in the vehicle width direction.

In addition, in the case where the airbag housed in the center console inflates with small articles and/or drink placed on the center console, those small articles on the center console are bounded up, thereby causing danger. Consequently, small articles and/or drink cannot be placed on the center console, and thus the center console may not be effectively used in normal conditions.

SUMMARY OF THE DISCLOSURE

The present disclosure has been designed in consideration of the circumstances described above, and an object thereof is to provide an airbag device that is used in a vehicle having seats disposed apart from each other in a vehicle width direction to restrain movement of an occupant in the vehicle width direction due to a side collision, allows the space between the seats to be effectively used in normal conditions, and is capable of sufficiently supporting a deployed airbag.

An aspect of the present disclosure provides an airbag device used in a vehicle having seats disposed apart from each other in a vehicle width direction, the airbag device including an airbag that is disposed in each of at least one pair of adjacent seats. The airbags of the at least one pair of adjacent seats are inflatable and deployable substantially simultaneously between the adjacent seats, and the airbags the at least one pair of adjacent seats are contactable with each other.

DETAILED DESCRIPTION

FIGS. 1A and 1B to FIGS. 4A and 4B illustrate an implementation of the present disclosure.

Figure 1A:
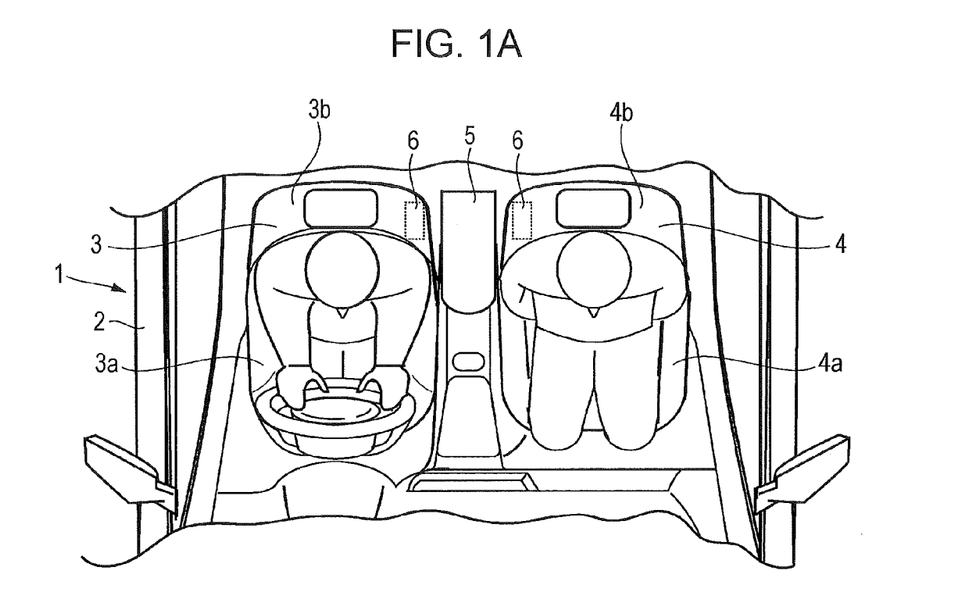
FIG. 1A is a schematic plan view of the front part of the vehicle cabin in normal conditions of a vehicle equipped with an airbag device in the present implementation.

As illustrated in FIG. 1A, in a vehicle 1 equipped with an airbag device in the present disclosure, a driver's seat 3 and a front passenger seat 4 are disposed in a vehicle width direction and provided independently to each other in the front part of the cabin of a vehicle body 2. In addition, the driver's seat 3 and the front passenger seat 4 are disposed apart, and a center console 5 is provided between the driver's seat 3 and the front passenger seat 4.

The driver's seat 3 has a driver's seat seating surface 3a on which the driver sits, a driver's seat backrest 3b that extends upward from the rear of the driver's seat seating surface 3a and supports the back of the driver. The driver's seat seating surface 3a is freely movable along a seat rail (not illustrated) which is provided on the floor of the vehicle cabin and which extends in the fore-and-aft direction of the vehicle, and thus the position of the driver's seat seating surface 3a in the fore-and-aft direction with respect to the vehicle body may be changed. The driver's seat backrest 3b is freely rotatable about the shaft at a lower portion in the fore-and-aft direction of the vehicle, and the backrest angle is adjustable. The front passenger seat 4 also has a front passenger seat seating surface 4a and a front passenger seat backrest 4b, and so the front passenger seat 4 has a similar configuration to that of the driver's seat 3. The center console 5 is provided in the fore-and-aft direction of the vehicle and includes a storage box for storing small articles and a drink holder for holding a drink container.

An airbag device 6 is provided beneath each of the lateral face of the driver's seat backrest 3b, facing the front passenger seat 4 and the lateral face of the front passenger seat backrest 4b, facing the driver's seat 3. As illustrated in the cross-sectional plan view of the airbag device 6 of FIG. 1B, the airbag device 6 includes an airbag 61 which is inflatable and deployable at the time of collision of the vehicle 1, and an airbag housing 62 that houses the airbag 61 which is folded.

Figure 1B:
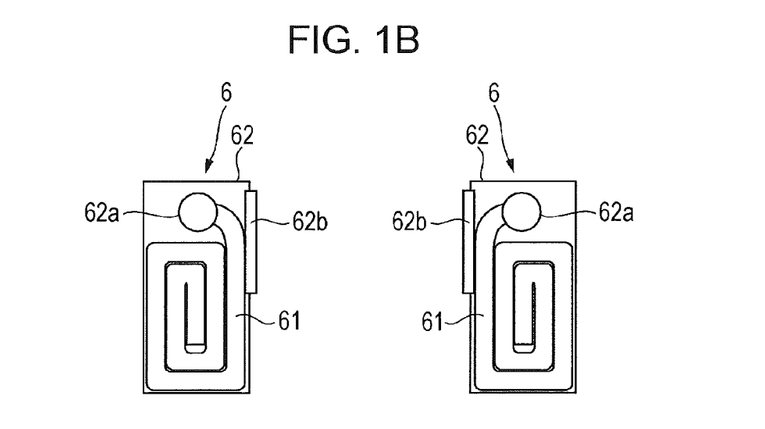
FIG. 1B is a schematic cross-sectional plan view of the airbag device.

The airbag 61 is designed to inflate and deploy inwardly in the vehicle width direction as well as in a fore-and-aft direction and a vertical direction of the vehicle. The inflated and deployed airbag 61 is in a shape extending forward and rearward of the driver's seat backrest 3b and the front passenger seat backrest 4b in a fore-and-aft direction of the vehicle, the seat backrests 3b and 4b being each equipped with the airbag device 6.

The airbag 61 has a plurality of tethers 61a attached to the inner surface thereof for regulating the shape of the airbag 61 when inflated and deployed. The shape of the outer face of the inflated and deployed airbag 61 inward in the vehicle width direction is regulated by the plurality of tethers 61a. The attachment of the tethers 61a to the inner surface of the airbag 61 inward in the vehicle width direction regulates the inward side of the airbag 61 in the vehicle width direction to have a planar shape, the tethers 61a having rigidity in a vertical direction and a fore-and-aft direction of the vehicle. The shape of the airbag 61 may be regulated by other methods, for example, the tethers 61a pulls the inner surface of the airbag 61 inward in the vehicle width direction toward the inner surface of the airbag 61 outward in the vehicle width direction.

Figure 3:
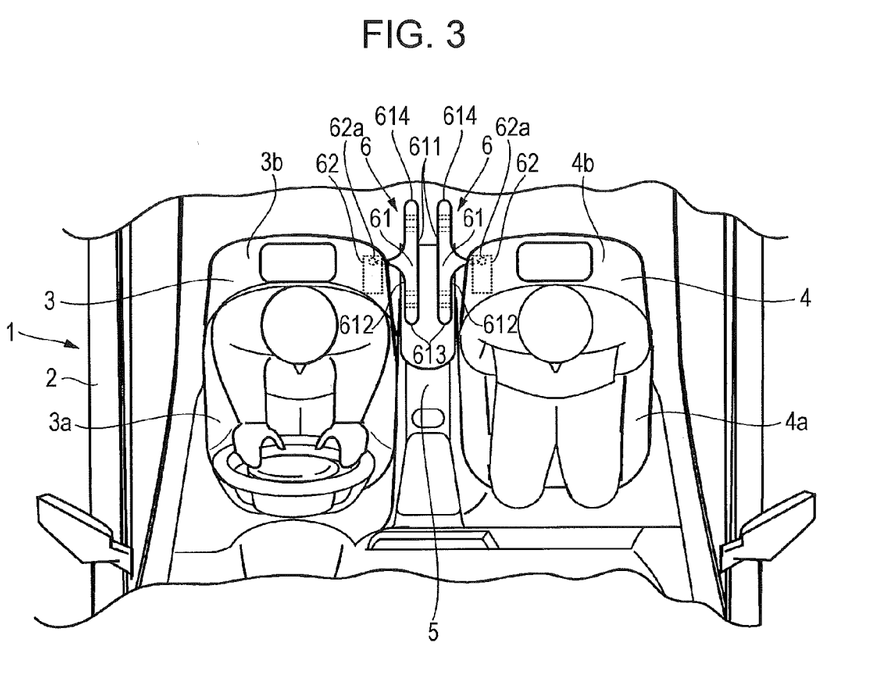
FIG. 3 is a schematic plan view of the front part of the vehicle cabin when the airbag of the air bag device in the present implementation starts to deploy.

Thus, as illustrated in FIG. 3, the airbag 61 of the airbag device 6 of the driver's seat backrest 3b, and the airbag 61 of the airbag device 6 of the front passenger seat backrest 4b are designed to deploy in a fore-and-aft direction and a vertical direction of the vehicle, and mutually facing portions deploy so as to form a planar shape. That is, the outer surface of an inflated and deployed airbag 61 includes a far side face 611 that serves as the inner-side face in the vehicle width direction, a near side face 612 that is connected to an inflator 62a and serves as the outer-side face in the vehicle width direction, a front face 613 that serves as the front face in a fore-and-aft direction of the vehicle, and a rear face 614 that serves as the rear face in a fore-and-aft direction of the vehicle. The near side face 612 extends in a fore-and-aft direction of the vehicle and inflates up to approximately the height of the upper half body of an occupant or higher in a vertical direction, and inflation of the near side face 612 in the vehicle width direction is regulated so as to form a planar shape. In the present implementation, the shapes of the front face 613 and the rear face 614 are not regulated while inflating and deploying. Therefore, the opposed faces of two airbags 61 are in a substantially linear shape that extends in a fore-and-aft direction of the vehicle in a plan view.

In addition, the airbag 61 of the airbag device 6 of the driver's seat backrest 3b, and the airbag 61 of the airbag device 6 of the front passenger seat backrest 4b are designed to inflate and deploy substantially simultaneously. That is, the airbag 61 of the airbag device 6 of the driver's seat backrest 3b, and the airbag 61 of the airbag device 6 of the front passenger seat backrest 4b are controlled so that the time intervals of inflation and expansion of both airbags 61 are overlapped. In the present implementation, as described later, the both airbags 61 are controlled so as to start inflation and expansion substantially simultaneously. The present invention is not limited to this, and it is sufficient that the time intervals of the inflation and expansion of both airbags 61 are overlapped. That is, both airbags 61 are not needed to start to inflate and deploy substantially simultaneously as far as the airbags 61 share a time interval during which the airbags 61 inflate and deploy.

The airbag housing 62 is provided with an inflator 62a which is connected to the airbag 61. A gas discharged from the inflator 62a is supplied into the airbag 61. In addition, the airbag housing 62 is provided with a cover portion 62b inwardly in the vehicle width direction, through which the airbag 61 moves upward from the airbag housing 62 when the airbag 61 inflates and deploys. For this reason, when a gas is supplied into the airbag 61 from the inflator 62a, the airbag 61 starts to inflate and deploy inwardly in the vehicle width direction from the cover portion 62b.

Figure 2:
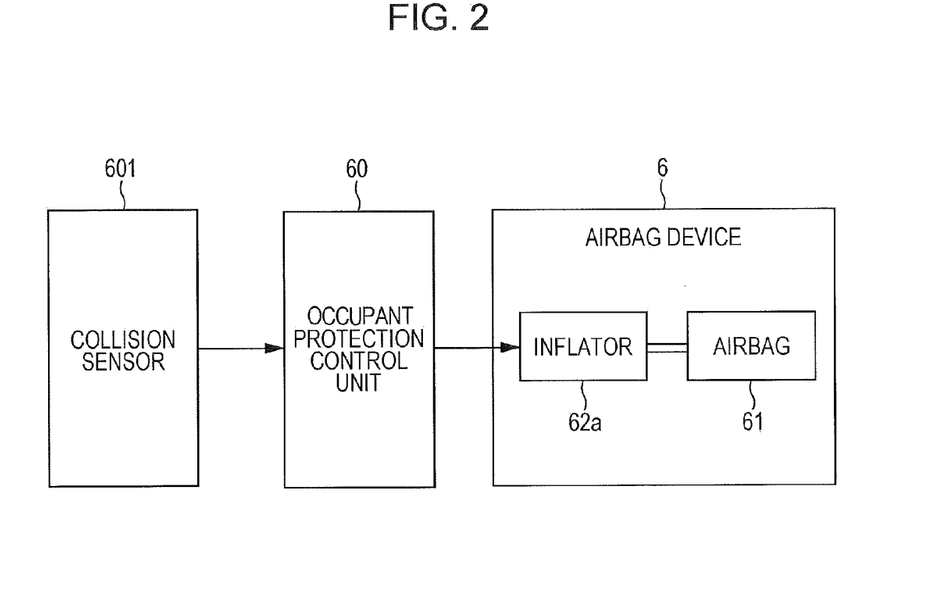
FIG. 2 is a block diagram illustrating input/output of control signals related to the airbag device in the present implementation.

As illustrated in FIG. 2, the airbag device 6 is controlled by an occupant protection control unit 60. The occupant protection control unit 60 is, for example, a CPU or an ECU, and has an input side and an output side, the input side being connected to a collision sensor 601 that detects a collision of the vehicle 1, the output side being connected to the inflator 62a.

In the case where the collision sensor 601 detects a collision of the vehicle 1, a detection signal is outputted from the collision sensor 601 to the occupant protection control unit 60. Upon receiving an input of the detection signal, the occupant protection control unit 60 outputs a control signal to the inflator 62a, the control signal for starting supply of gas to the airbag 61. In the present implementation, the inflator 62a is provided in each of the driver's seat backrest 3b and the front passenger seat backrest 4b, and upon receiving an input of a detection signal from the collision sensor 601, the occupant protection control unit 60 outputs a control signal to each inflator 62a simultaneously. The inflator 62a, after receiving the control signal from the occupant protection control unit 60, supplies a gas into the airbag 61. Upon receiving the control signal from the occupant protection control unit 60, the inflator 62a provided in the airbag housing 62 of the driver's seat backrest 3b, and the inflator 62a provided in the airbag housing 62 of the front passenger seat backrest 4b start to supply a gas substantially simultaneously.

It is to be noted that a collision prediction device for predicting a collision of the vehicle 1 may be connected to the input side of the occupant protection control unit 60, the prediction being made based on movement information of the vehicle 1 obtained by a sensor or on environmental information outside the vehicle 1 obtained by a camera or a sensor. In this case, when a collision of the vehicle 1 is predicted by the collision prediction device, a collision prediction signal is outputted from the collision prediction device to the occupant protection control unit 60, and the occupant protection control unit 60 outputs a control signal to the inflator 62a based on the collision prediction signal, the control signal for starting supply of gas to the airbag 61.

The operation of the airbag device 6 at the time of side collision of the vehicle 1 having the above configuration will be described.

When the collision sensor 601 detects a collision of the vehicle 1, a control signal for supplying gas to the airbag 61 is outputted from the occupant protection control unit 60 to the inflator 62a. The inflator 62a, which has received the control signal, supplies gas into the airbag 61, then the airbag 61 starts to inflate and deploy. As illustrated in FIG. 3, the airbag 61 inflates and deploys inwardly in the vehicle width direction substantially simultaneously from each of the airbag housing 62 beneath a lateral face of the driver's seat backrest 3b, the lateral face facing the front passenger seat and the airbag housing 62 beneath a lateral face of the front passenger seat backrest 4b, the lateral face facing the driver's seat. In this process, the airbag 61 inflates and deploys in a vertical direction and extends in a fore-and-aft direction of the vehicle in a long range. In addition, the far side face 611 of the airbag 61 inflates and deploys while being regulated to form a planar shape.

Figure 4A:
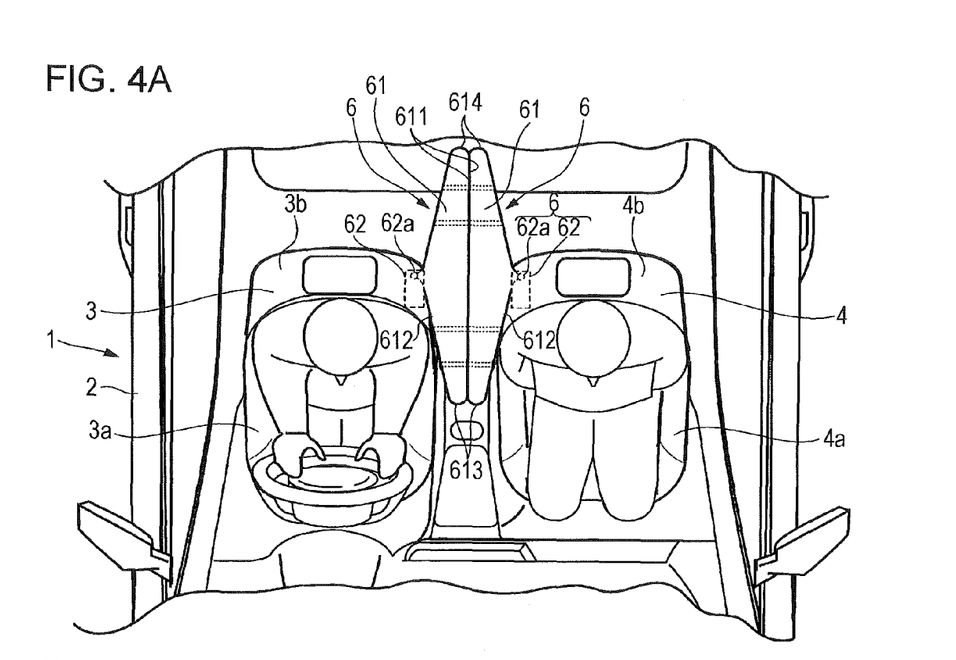
FIGS. 4A and 4B are each a schematic plan view of the front part of the vehicle cabin when the airbag of the air bag device in the present implementation has inflated.

As the airbag 61 inflates and deploys, as illustrated in FIG. 4A, the airbag 61 in the airbag housing 62 of the driver's seat backrest 3b, and the airbag 61 in the airbag housing 62 of the front passenger seat backrest 4b come into contact with each other at the respective far side faces 611 above approximately the middle of the driver's seat 3 and the front passenger seat 4, that is, above the center console 5. Since the far side face 611 of each inflated and deployed airbag 61 has a planar shape, the contact area between the two airbags 61 is designed to be large.

Figure 4B:
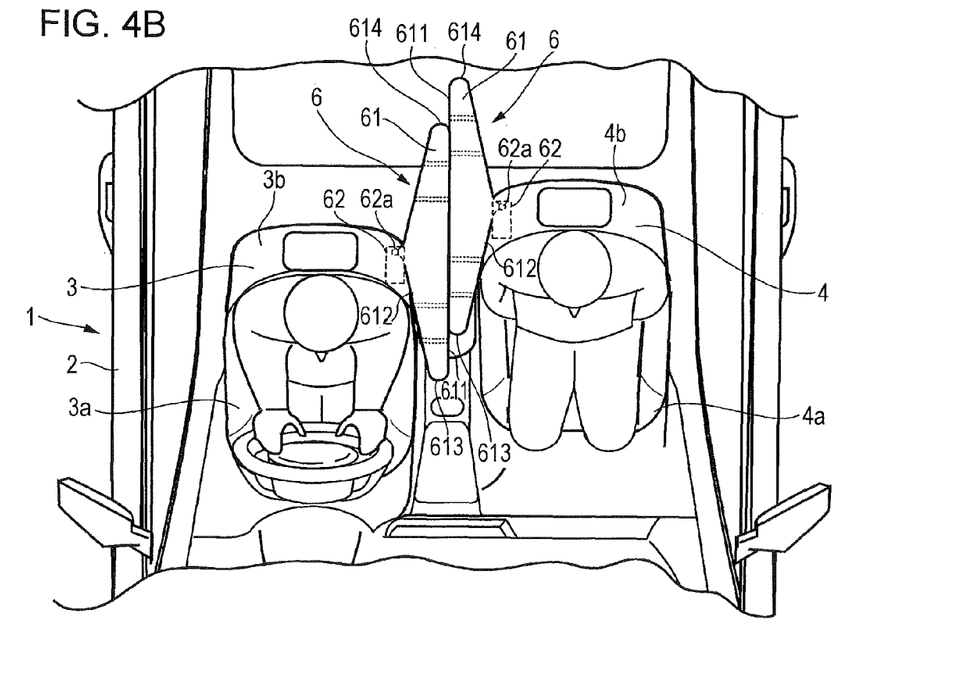

Each airbag 61 inflates and deploys so as to extend in a fore-and-aft direction of the vehicle in a long range, and the far side face 611 forms a planar shape. Therefore, as illustrated in FIG. 4B, even when the positions of the driver's seat 3 and the front passenger seat 4 in a fore-and-aft direction of the vehicle are not aligned, for example, when the front passenger seat 4 has been moved rearwardly of the driver's seat 3, or even when the driver's seat backrest 3b and the front passenger seat backrest 4b have different backrest angles, the two airbags 61 are able to be in contact with each other.

In this manner, the far side faces 611 of the airbags 61, which have inflated and deployed substantially simultaneously from the respective lateral faces of a plurality of seats (the driver's seat 3 and the front passenger seat 4 in the present implementation) disposed in the vehicle width direction, come into contact with each other, thereby enabling the airbags 61 to mutually support a force applied in the vehicle width direction.

Figure 6A:
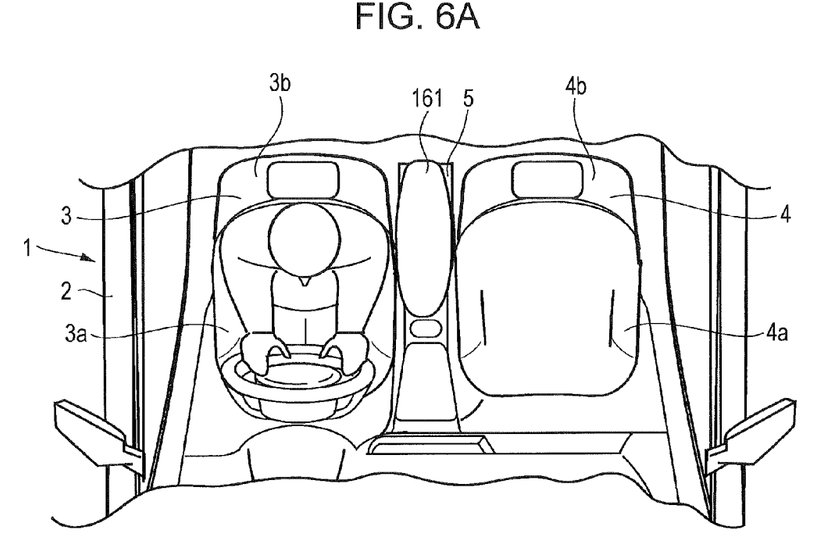
FIGS. 6A and 6B are each a schematic plan view of the front part of the vehicle cabin when the airbag in another implementation has inflated.
Figure 6B:
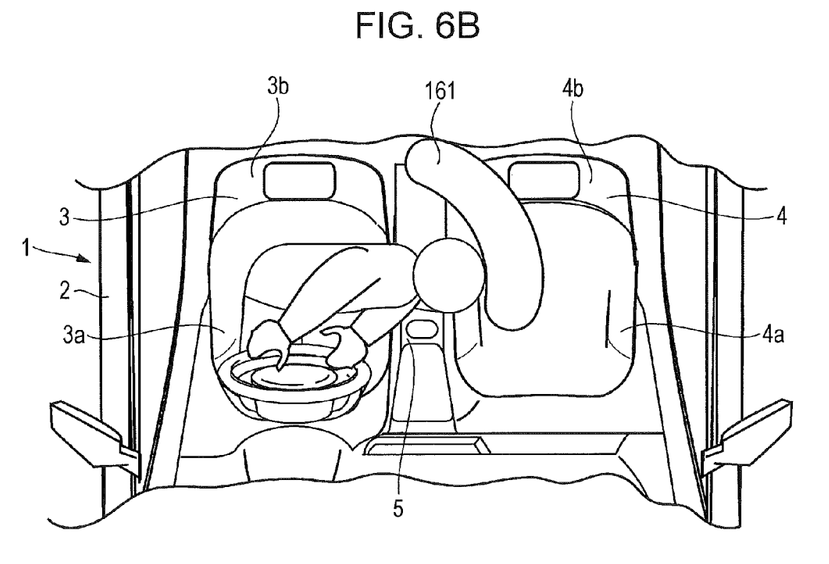

Here, it is assumed that an airbag 161 inflates and deploys downward, for example, from the ceiling of the vehicle body 2 between the driver's seat 3 and the front passenger seat 4 as illustrated in FIG. 6A, and attempts to restrain movement of a driver on the driver's seat toward the front passenger seat 4. In this case, the airbag 161 may not have a sufficient reaction force against the movement of a driver on the driver's seat toward the front passenger seat 4, and thus the driver on the driver's seat may be moved toward the front passenger seat 4 as illustrated in FIG. 6B. That is, no element is provided to support the airbag 161 in the vehicle width direction, and therefore the airbag 161 does not have a sufficient reaction force against the movement of the driver on the driver's seat toward the front passenger seat 4. Thus, at the time of side collision of the vehicle 1, movement of a driver from the driver's seat to the front passenger seat 4 is restrained by the airbag 61 which has inflated and deployed from the driver's seat backrest 3b. However, in the case where a single airbag 61 provides a small reaction force, a driver on the driver's seat may not be supported, and the driver may be moved from the driver's seat to the front passenger seat 4.

However, in the case where the airbags 61 provided in the driver's seat 3 and the front passenger seat 4 disposed in the vehicle width direction inflate and deploy, the far side faces 611 come into contact with each other to support each other. In this manner, the airbags 61 disposed in the vehicle width direction support each other to reinforce their reaction force, and thus it is possible to restrain movement of a driver on the driver's seat to the front passenger seat 4 and/or movement of a passenger on the front passenger seat to the driver's seat 3.

Also, since the airbags 61 are not supported by the sides of an occupant, a seat, or a vehicle body 2, but by the airbags 61 themselves as illustrated in FIG. 4A, even when an occupant is not on one of the driver's seat 3 and the front passenger seat 4, or the positions of both seats in a fore-and-aft direction of the vehicle are not aligned, it is possible to reliably reinforce the reaction force of each airbag 61. In this manner, the reaction force of each airbag 61 is reinforced, and thus a driver on the driver's seat and/or a passenger on the front passenger seat are supported by the near side faces 612 of the airbags 61, and the movement of a driver and/or a passenger in the vehicle width direction is restrained at the time of collision of the vehicle 1.

Furthermore, each airbag 61 inflates and deploys so that its far side face 611 becomes a planar shape extending in a fore-and-aft direction and a vertical direction of the vehicle. For this reason, even when the positions of the driver's seat 3 and the front passenger seat 4 in a fore-and-aft direction of the vehicle are not aligned, or even when the driver's seat backrest 3b and the front passenger seat backrest 4b have different backrest angles, both airbags 61 are able to be in contact with each other as illustrated in FIG. 4B. If the contact area between the airbags 61 has a curved shape, each airbag may slide and may not be able to support each other. However, each far side face 611 as a contact area between the airbags 61 has a planar shape, and thus it is possible for the airbags 61 to push each other inwardly in the vehicle width direction. Consequently, at the time of side collision of the vehicle 1, the reaction force of each airbag 61 in the vehicle width direction may be increased irrespective of the seat positions and the backrest angles, and thus it is possible to restrain movement of a driver on the driver's seat to the front passenger seat 4 and/or movement of a passenger on the front passenger seat to the driver's seat 3.

Furthermore, the airbag device 6 is provided in each of the driver's seat backrest 3b and the front passenger seat backrest 4b, the airbag 61 may be reduced in size compared with the case where one airbag is provided in the roof or the center console 5 of the vehicle 1. Thus, it is possible for the air bag device 6 to be provided even in the case where the vehicle is such that the driver's seat 3 and the front passenger seat 4 are small in size or the space between the driver's seat 3 and the front passenger seat 4 is narrow.

Also, each airbag 61 inflates and deploys so as to extend rearwardly of the driver's seat backrest 3b and the front passenger seat backrest 4b which are each provided with the airbag housing 62. Consequently, even when the positions and/or angles of the driver's seat 3 and the front passenger seat 4 in a fore-and-aft direction have a large difference, it is possible to cause the far side faces 611 of both airbags 61 to come into contact with each other reliably.

In the present implementation, the shape of the far side face 611 of each inflated and deployed airbag 61 is regulated by the tethers 61a. Alternatively, the shape of the far side face 611 of each airbag 61 may be regulated to form a planar shape using another approach.

The outer surface of the airbag 61, particularly, the surface of the far side face 611 may be provided with minute depressions and projections, or a Velcro tape or an antislipping agent may be applied to the surface. This increases the adhesive force of the contact area between the far side faces 611, and the reaction force of each airbag 61 may be reinforced more firmly.

The airbag 61 in the present implementation is designed to inflate and deploy between the driver's seat 3 and the front passenger seat 4. Alternatively, the airbag 61 may be used also in a vehicle which is provided with three or more seats disposed in the vehicle width direction. In this case, the airbag 61 inflates and deploys from the backrest of a seat toward an adjacent seat and comes into contact with another airbag 61 which has inflated and deployed from the backrest of the adjacent seat. The contact area between the airbags 61 has a planar shape, and the reaction force is increased by mutual pressing between the airbags 61.

Figure 5A:
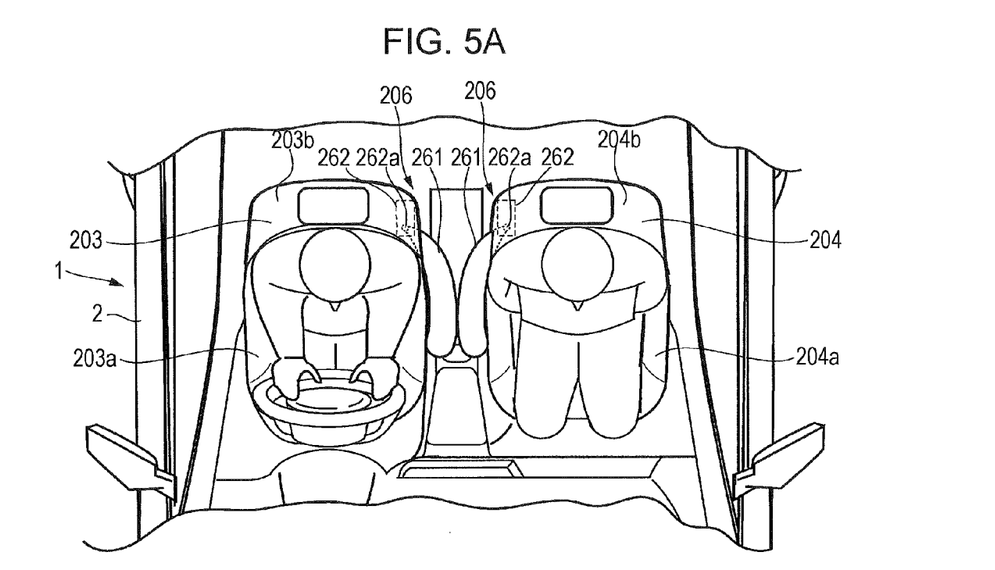
FIGS. 5A and 5B are each a schematic plan view of the front part of the vehicle cabin when the airbag in a modified implementation has inflated.

Next, an airbag device 206 as a modification of the airbag 61 in the above-described implementation will be described with reference to FIGS. 5A and 5B. A description of repeated or the same components as those in the above-described implementation will be omitted.

The airbag 261 included in the airbag device 206 is housed in an airbag housing 262 which is provided beneath the lateral face of a driver's seat backrest 203b, facing a front passenger seat 204 and beneath the lateral face of a front passenger seat backrest 204b, facing a driver's seat 203. When a collision of the vehicle 1 is detected, a gas is supplied from the respective inflators 262a of the airbag housings 262 into the airbags 261 substantially simultaneously at substantially the same speed.

A cover portion 262b in each of the airbag housings 262 is provided such that the outer surface of the cover portion 262b faces frontward in a fore-and-aft direction of the vehicle and inward in the vehicle width direction. The airbag 261 has tethers 261a attached to the inner surface thereof for regulating the shape of the airbag 261 at the time of inflation and expansion to form an approximately elliptical shape in a plan view, and on end of the longer axis of the approximately elliptical shape is connected to the inflator 262a.

In this manner, when a gas is supplied into each of the airbags 261, each airbag 261 starts to inflate and deploy forwardly in a fore-and-aft direction of the vehicle and inwardly in the vehicle width direction. That is, each airbag 261 inflates and deploys from a corresponding airbag housing 262 to a position forward of the mid-point between the driver's seat backrest 203b and the front passenger seat backrest 204b.

With this configuration, the airbag 261 which has inflated and deployed from the driver's seat backrest 203b, and the airbag 261 which has inflated and deployed from the front passenger seat backrest 204b come into contact with each other between the driver's seat 203 and the front passenger seat 204. When the positions of the driver's seat 203 and the front passenger seat 204 are approximately the same, once the airbags 261 start to inflate and deploy, the end portions of the airbags 261 come into contact with each other at the mid-point between the driver's seat 203 and the front passenger seat 204, and the airbags 261 continue to inflate and deploy forwardly while pushing each other. Consequently, when the airbags 261 have completely inflated and deployed, the inner sides of the airbags 261 in the vehicle width direction are in contact with each other as illustrated in FIG. 5A.

Figure 5B:
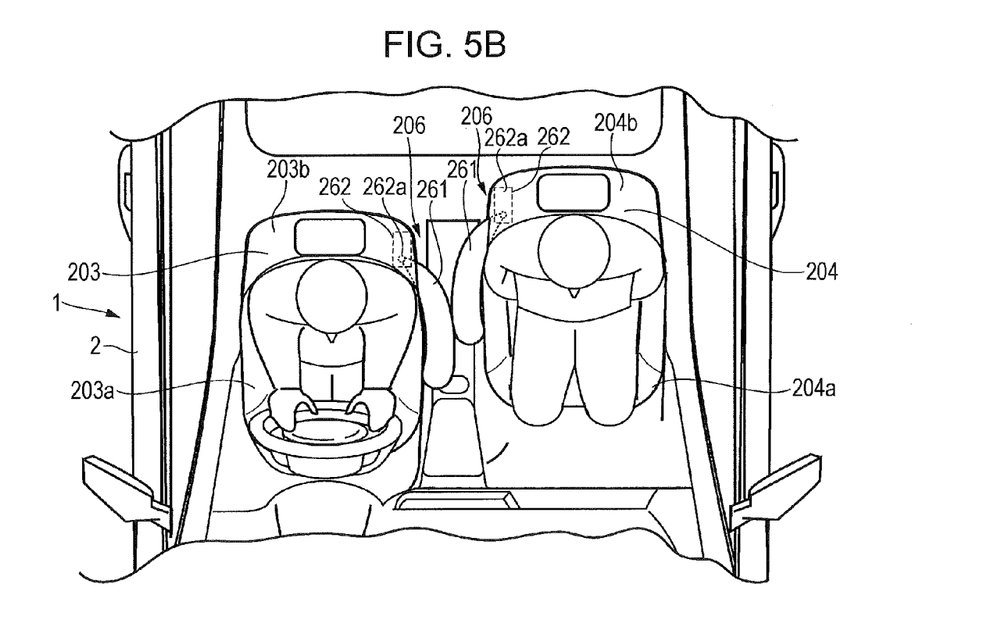

When the positions of the driver's seat 203 and the front passenger, seat 204 in a fore-and-aft direction of the vehicle are not aligned, or when the driver's seat backrest 203b and the front passenger seat backrest 204b have different backrest angles, the airbags 261 are as illustrated in FIG. 5B. For example, when the front passenger seat 204 has been moved rearwardly of the driver's seat 203, the end portion of the airbag 261 which has inflated and deployed from the front passenger seat backrest 204b, comes into contact with the vehicle-widthwise inner side of the airbag 261 which has inflated and deployed from the driver's seat backrest 203b, and the airbags 261 continue to inflate and deploy forwardly while pushing each other. Thus, when the airbags 261 have completely inflated and deployed, a rear portion of the vehicle-widthwise inner side of one airbag 261 is in contact with a front portion of the vehicle-widthwise inner side of the other airbag 261 as illustrated in FIG. 5B. In this manner, at the time of side collision of the vehicle 1, the forward inflation and expansion of both airbags 261 from the vehicle-widthwise inner side thereof enables to reinforce the reaction force of the airbags 261 each other and to restrain movement of a driver on the driver's seat to the front passenger seat 204 and/or movement of a passenger on the front passenger seat to the driver's seat 203 irrespective of the seat positions and the backrest angles.

The invention claimed is:

1. An airbag device used in a vehicle having seats disposed apart from each other in a vehicle width direction, the airbag device comprising:

an airbag that is disposed in each of at least one pair of adjacent seats,     wherein the airbags of the at least one pair of adjacent seats are inflatable and deployable substantially simultaneously between the adjacent seats, and     wherein the airbags of the at least one pair of adjacent seats include a far side face including a contact region, each far side face of the airbags is contactable with each other in the contact region,     wherein the airbags are inflatable and deployable such that the contact region of the far side face of each airbag is equally disposed in relation to the seats in a fore-and-aft direction of the vehicle, and     wherein an outer surface of the inflated and deployed airbag includes a far side face being an inner-side face of the airbag in the vehicle width direction, the far side face including an anti-slipping agent being applied thereto.

2. The airbag device according to claim 1, wherein each of the airbags of the at least one pair of adjacent seats, when inflated and deployed, includes a portion facing the adjacent seat, the portion having a substantially planar shape extending in a fore-and-aft direction and a vertical direction of the vehicle, and     the portion in the substantially planar shape of one of the airbags of the at least one pair of adjacent seats is contactable with the portion in the substantially planar shape of the other one of the airbags of the at least one pair of adjacent seats, which has inflated and deployed from the adjacent seat.

3. The airbag device according to claim 2, wherein each of the airbags of the at least one pair of adjacent seats is inflatable and deployable from a lateral face of a backrest that is provided in the corresponding seat, the lateral face facing the adjacent seat.

4. The airbag device according to claim 3, wherein each of the airbags of the at least one pair of adjacent seats is inflatable and deployable backward from the backrest of the corresponding seat.

5. The airbag device according to claim 1, wherein each of the airbags of the at least one pair of adjacent seats is inflatable and deployable from a lateral face of a backrest that is provided in the corresponding seat, the lateral face facing the adjacent seat.

6. The airbag device according to claim 5, wherein each of the airbags of the at least one pair of adjacent seats is inflatable and deployable backward from the backrest of the corresponding seat.

7. The airbag device according to claim 1, wherein an outer surface of an inflated and deployed airbag includes:
- a near side face that is connected to an inflator and being an outer-side face of the airbag in the vehicle width direction;
- a front face being a front-side face of the airbag in a fore-and-aft direction of the vehicle; and
- a rear face being a rear-side face of the airbag in a fore-and-aft direction of the vehicle.

8. The airbag device according to claim 7, wherein opposing near side faces of two airbags are in a substantially linear shape that extends in a fore-and-aft direction of the vehicle in a plan view.

9. The airbag device according to claim 1, wherein opposed faces of two airbags are in a substantially linear shape that extends in a fore-and-aft direction of the vehicle in a plan view.

10. An airbag device used in a vehicle having seats disposed apart from each other in a vehicle width direction, the airbag device comprising:
- an airbag that is disposed in each of at least one pair of adjacent seats,
- wherein the airbags of the at least one pair of adjacent seats are inflatable and deployable substantially simultaneously between the adjacent seats,
- wherein the airbags of the at least one pair of adjacent seats include a far side face including a contact region, each far side face of the airbags is contactable with each other in the contact region,
- wherein the airbags are inflatable and deployable such that the contact region of the far side face of each airbag is equally disposed in relation to the seats in a fore-and-aft direction of the vehicle, and
- wherein the far side face includes an anti-slipping agent being applied thereto such that the far side face of a first air bag of the airbags and the far side face of a second air bag of the airbags do not slip when contacting each other when the airbags are inflated and deployed.

11. An airbag device used in a vehicle having seats disposed apart from each other in a vehicle width direction, the airbag device comprising:
- an airbag that is disposed in each of at least one pair of adjacent seats,
- wherein the airbags of the at least one pair of adjacent seats are inflatable and deployable substantially simultaneously between the adjacent seats, and
- wherein the airbags of the at least one pair of adjacent seats include a far side face including a contact region, each far side face of the airbags is contactable with each other in the contact region,
- wherein the far side face includes an anti-slipping agent applied thereto.

12. The airbag device according to claim 11,
- wherein each of the airbags of the at least one pair of adjacent seats, when inflated and deployed, includes a portion facing the adjacent seat, the portion having a substantially planar shape extending in a fore-and-aft direction and a vertical direction of the vehicle, and
- wherein the portion in the substantially planar shape of one of the airbags of the at least one pair of adjacent seats is contactable with the portion in the substantially planar shape of the other one of the airbags of the at least one pair of adjacent seats, which has inflated and deployed from the adjacent seat.

* * * * *